Patented May 23, 1950

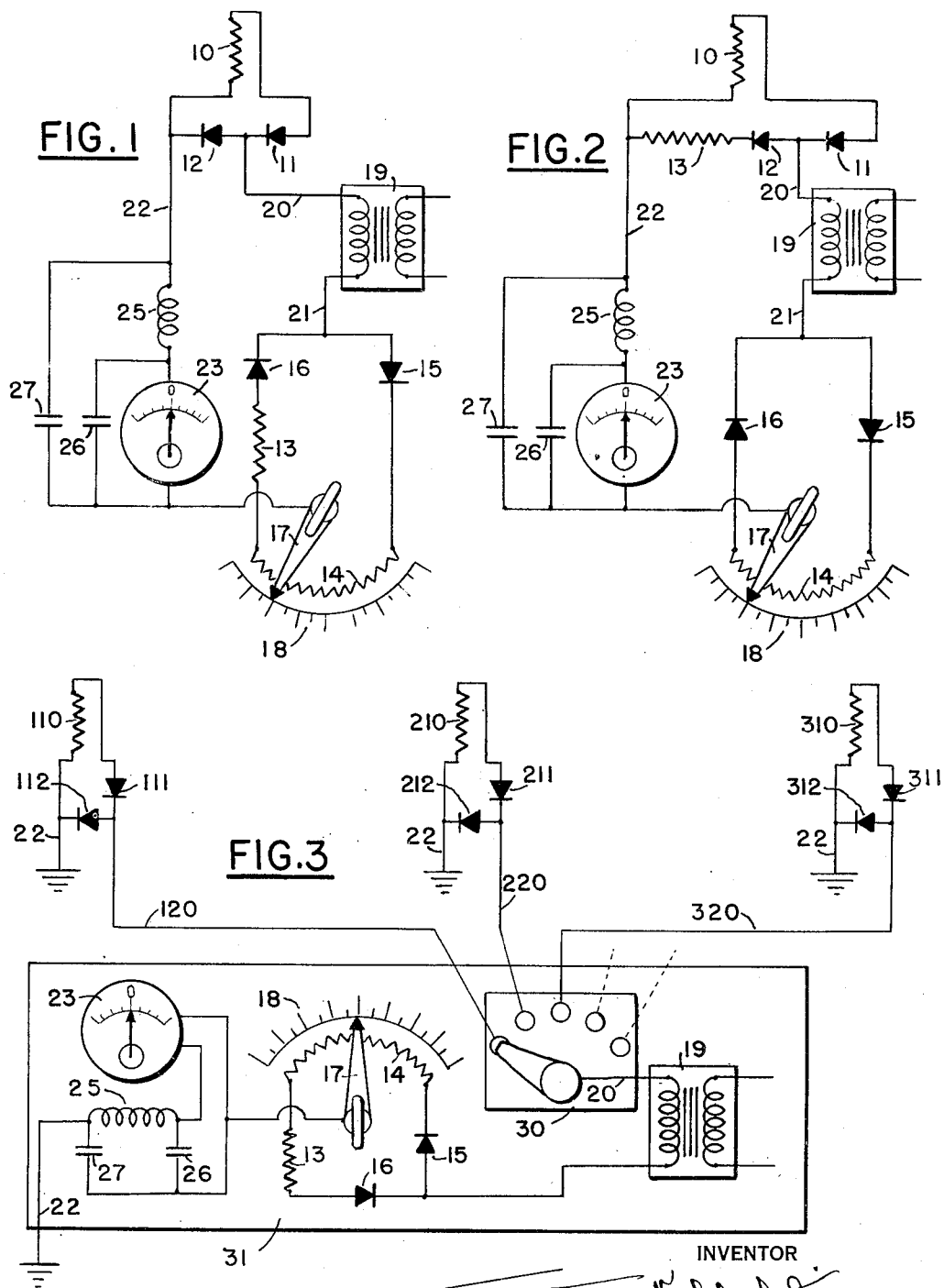

2,508,478

UNITED STATES PATENT OFFICE 2,508,478

MEANS FOR DETERMINING ELECTRICAL RESISTANCE VALUES

Fritz Frederick Uehling, Passaic, N. J.

Application June 15, 1948, Serial No. 33,063

10 Claims. (Cl. 73—362)

This invention relates to improved means for determining electrical resistance values, and more particularly to resistance thermometers and the like, wherein it is required that the resistance of one portion of an electrical network, varying with temperature or some other magnitude to be measured, be effective to produce changes at another point in the network, whereby its value may be determined independently of the value, or of variations in the resistance of an intervening portion of said network. While the principles of my invention are generally applicable to any device wherein measurement of a variable is based upon changes in the value of an electrical resistor, it will here be particularly described in its adaptation to the electrical resistance thermometer, wherein a resistance element, or "bulb," comprised of metal or other material having predetermined temperature/resistance characteristics is exposed to a temperature to be measured, and is coordinated with means whereby its resistance value may be more or less continuously determined, and expressed in terms of temperature units.

In the conventional methods of determining electrical resistance, that portion of the network whose resistance value is under measurement is defined by two terminals; and, as will be apparent to those versed in the art, in order that the measurement of this portion be truly performed, without possible error due to inclusion of connecting leads, it becomes necessary, whether use is made of the "fall-of-potential" method, or of some one of the several forms of bridges, that connection between these terminals and the remainder of the network include not two, but three or more conductors. In any installation where the distance between the resistance element under measurement and the instrument incorporating the measuring network is such as to involve an interconnection of appreciable resistance value, this requirement is recognized; and, in its relation to resistance thermometers, it is fully discussed in U. S. Bureau of Standards Bulletin No. 170 (1921), pages 129–133.

It is a well-known fact that in the installation of electrical apparatus requiring circuits for interconnecting separated locations the two-wire circuit has much to recommend it over circuits requiring a greater number of conductors. The need for a circuit having three or more separate conductors to connect a resistance element to the indicating, recording, or controlling instrument with which it is operatively associated imposes a severe limitation on the use of the method.

For example, in such an installation as a large building, wherein it is desired that the temperatures at a considerable number of stations throughout the structure be successively measured by an instrument located at a central point, it becomes essential that each of the temperature-sensitive units be connected to the instrument by a cable of at least three conductors, with the result that the cost of the interconnecting lines may easily become the predominating part of that of the whole installation.

It is an object of the present invention to provide a measuring system of the resistance-thermometer class wherein connection between the sensitive elements and the exhibiting instrument may be completed through a circuit comprising only two conductors.

It is a further object to provide a system of the above nature wherein determination of the resistance value of the sensitive element shall be unaffected by wide changes in characteristics of the interconnecting line.

It is a further object to provide a system of the above nature wherein the accuracy of measurement shall be unaffected by parasitic potentials induced in the interconnecting leads.

It is a further object to provide a system of the above nature readily adaptable to selective measurement of temperatures at a plurality of points, and in which a ground or common connection may be substituted for one of the two wires in each two-conductor interconnecting circuit.

In carrying out the purposes of the invention, it is proposed to utilize alternating-current energization in an electrical network including a variable resistance whose value is a function of the magnitude to be measured. By means of suitably placed rectifying elements, the current is so divided that, while half-waves, or impulses, of a rectified component of said alternating current flow in those portions of the network whose resistance values are involved in the measurement or incidental computation, both components, comprising a true alternating current, flow jointly in those parts of the network which serve solely for purposes of interconnection, and whose resistances are of no significance in the desired measurement. By thus segregating the rectified and the un-rectified currents in different portions of the circuit, I have found it possible to obtain an ultimate and quantitative response subject to changes only in those parts of the circuit carrying rectified current, and unaffected by changes in other parts of the circuit.

In the drawings:

Figure 1 is a diagrammatic representation of a measuring network embodying the principles of the invention.

Figure 2 illustrates an alternative to certain features illustrated in Figure 1.

Figure 3 shows an application of the principles of the invention to selective measurement of a plurality of resistances, or quantities represented thereby.

In the particular form of the invention as illustrated in Figure 1, a temperature-sensitive resistor 10 is formed of a wire having a known temperature coefficient of resistivity, or some one of those semi-conducting ceramic materials known as "thermistors." Such a resistor 10 forms part of a closed loop comprising two similar rectifying elements 11 and 12 connected to have similar polarity about the loop. A second loop is formed of a fixed resistor 13 having a value equal to the nominal value of the resistor 10 (i. e. a value which it may attain in its working range and which may be considered as a standard of reference), a slide-wire 14, and a second pair of rectifying elements 15 and 16 arranged to have similar polarity about the loop. The slide-wire 14 is adjustably divided into two portions by means of a sliding or translatable contact member 17 engaging the slide-wire, the purpose of said sliding contact member being to change the resistance of that portion of the loop which includes the rectifier 16 with respect to that portion of the loop which includes the rectifier 15, said slide-wire thereby comprising a voltage dividing resistor said sliding contact member having its translated position indicated by an attached pointer cooperating with a stationary graduated scale 18.

One side of a source of alternating current, as for example the secondary winding of a transformer 19, is connected by a conductor 20 to the junction point between the rectifiers 11 and 12, and the other side of said source by means of a conductor 21 to the junction point between the rectifiers 15 and 16. The junction point between the rectifier 12 and the resistor 10 is connected to the sliding contact member 17 by means of a conductor 22 having in series therewith a galvanometer 23, or equivalent detector of unidirectional current. Since, as will presently be made clear, the current in the conductor 22 may have both unidirectional and alternating components, and since the galvanometer is required to be responsive to the former only, it is expedient that there be provided a filter system, as for example an inductive element 25 in series with the galvanometer, a capacitor 26 in parallel with the galvanometer, and a further capacitor 27 in parallel with said combination of galvanometer, inductance and capacitor 26.

Operation of the apparatus as thus far set forth may be explained as follows: Upon an alternating potential being impressed from the terminals of the transformer secondary winding upon the circuit connected thereto, alternating current will tend to flow therein, and, because of the rectifiers in the two loops, will divide therethrough according to the polarities of said rectifiers. Thus, in the loop formed by the resistor 10 and the rectifiers 11 and 12, with the polarities of the latter arranged as indicated, "positive" half-waves or impulses of current from the conductor 20 will flow through the rectifier 12 to the conductor 22, while the "negative" pulses will flow through the rectifier 11 in series with the variable resistor 10 to the conductor 22. Thus, the loop forms a divided circuit, of which the respective branches are traversed by the respective opposed half-waves of the current flowing between the conductors 20 and 22. In a similar manner alternating current flowing between the conductors 22 and 21 will divide in the two branches formed by the loop containing the resistor 13, the slide-wire 14 and the rectifiers 15 and 16, the "positive" pulses passing through the left-hand portion of the slide-wire 14 (as seen in Figure 1 and as determined by the position of the contact 17), the fixed resistor 13 and the rectifier 16, while the "negative" pulses will pass through the remaining portion of the slide-wire 14 and the rectifier 15.

Thus, considering the whole circuit, the "positive" current pulses will pass through a path including the conductor 20, the rectifier 12, the conductor 22, the movable contact member 17, the left-hand portion (as seen in the diagram) of the slide-wire 14, the fixed resistor 13, the rectifier 16 and the conductor 21. Similarly the "negative" pulses will pass through a path including the conductor 20, the rectifier 11, the variable resistor 10, the conductor 22, the movable contact 17, the right-hand portion of the slide-wire 14, the rectifier 15 and the conductor 21. Therefore, while the respective branches into which each of the two loops is divided by means of the included rectifiers carry unidirectional current, the conductors 20, 21 and 22 carry both halves of the waves, comprising an alternating current; and, if the total resistance of one of said paths be equal to that of the other, the amplitudes of the pulses, or half-waves, of opposite polarity will be equal, and the current flowing in the common conductors 20, 21 and 22 will be pure alternating current devoid of any unidirectional component. This condition will attain, for example, when the resistor 10 plus the right-hand portion of the slide-wire 14 (as determined by the position of the movable contact 17) is at a value equal to that of the combined values of fixed resistor 13, and the left-hand portion of the slide-wire 14.

The filter circuit comprising the capacitors 26 and 27 and the inductance 25, connected as set forth will serve to protect the galvanometer 23 from alternating-current effects. The inductance 25 will offer to the alternating current flowing in the conductor 22 a high impedance in comparison with the capacitance 27, and the capacitor 26 will act as a short circuit for any residual alternating electromotive force which may be impressed upon the terminals of the galvanometer 23, so that, if these reactive circuit elements be suitably selected, the alternating component of current passing in the galvanometer winding may be reduced to negligible magnitude.

It may now be assumed that the resistance of the element 10 has been increased by a certain increment, due, for example, to a change in the temperature to which it is exposed. This will effect a decrease in the amplitude of the "negative" half-waves or impulses flowing through the circuit branch which includes said resistance element and the rectifier 11, while at the same time the amplitude of the "positive" half-waves flowing through the rectifier 12 will be unaffected. Thus, the two halves of the alternating current flowing in the conductors 20, 21 and 22 will no longer be balanced, or, in other words, the current in said conductors will have a direct-current component. Since the capacitors 26 and 27 form a barrier to the flow of direct current, which, however, may pass freely through the inductance 25, said current will flow in the winding of the galvanometer 23, causing the same to respond in intensity and direction depending upon the magnitude and polarity of the unidirectional current flow.

Since the inequality of the respective half-waves of the current flowing in the circuit is due to a difference in the total resistances of the paths traversed by the pulses of different polarities, it follows that a balance may be restored by any means which will again make the resistances of these paths equal in value. As previously pointed out, in reference to the particular form of the invention as illustrated in Figure 1, the current component of one polarity traverses the resistor 10 and the right-hand portion of the slide-wire 14, and that of the opposite polarity traverses the resistor 13 and the left-hand portion of the slide-wire 14, and since the unbalanced condition is due to an increase in the resistance of the former path, it follows that the balance may be restored by moving the sliding contact 17 to the right, thereby decreasing the resistance to the current component which traverses the resistance 10 and simultaneously increasing the resistance to the current component which traverses the resistance 13. As the resistances of the two paths approach equality, the opposed half-waves of current will similarly approach a common amplitude, which condition will be concomitant with a reduction, eventually to zero, of the unidirectional component of current in the conductor 22, as indicated by the deflection of the galvanometer 23. In a similar manner, should the resistance of the element 10 be subject to decrease, a compensating change may be made by moving the sliding contact element 17 toward the left, balance being detected as before by a reduction of the galvanometer deflection to zero, whereon the change in the position of the sliding contact 17 will be a measure of the resistance value of the unit 10. Thus, any change in the resistance of the sensitive element 10, as represented by a deflection of the galvanometer 23, may be compensated for by adjusting the position of the sliding contact 17 until the deflection is reduced to zero, whereupon the new position of the sliding contact 17, as indicated on the scale 18, will represent the new resistance value, and hence the temperature (or other variable) to which the resistance of the element 10 is responsive.

Adjustment of the sliding contact 17 to establish or restore a balanced condition in the network has been assumed to be manually effected, in response to an observed deflection of the galvanometer 23; but, to those versed in the art, it will be obvious to substitute any one of the many well-known self-balancing instruments, such, for example, as that fully set forth and claimed in U. S. Letters-Patent No. 2,022,097 granted to me November 26, 1935 (and for which no invention is herein claimed), for the purpose of automatically performing such adjustment and providing a continuous indication or record of the measured magnitude.

Since the principle of the invention, as set forth, is based upon establishing equality between the resistance of the path traversed by a first pulsating current passing through the rectifiers 11 and 15 in series, which path includes the variable resistor 10 and the resistance of the path traversed by a second pulsating current passing through the rectifiers 12 and 16 in series, which path includes the fixed resistor 13, it follows that the location of each of these resistors in its respective unidirectional current path is immaterial. Thus, should it be desired, the resistor 13 may be transferred, as shown in Figure 2, from that leg of the loop which includes the rectifier 16 to that leg of the other loop which includes the rectifier 12, in which case the characteristics, performance and adjustment of the circuit will be identical with those hereinbefore set forth. In general, however, since it is commonly desirable to maintain at a minimum the amount of apparatus to be located in proximity to the sensitive resistance element, the arrangement shown in Figure 1 is to be preferred over that shown in Figure 2.

It will be obvious that, since any change in the resistance of the conductors 20, 21 and 22, or of the current path through the transformer secondary 19, will affect equally the pulses of both polarities comprising the alternating current, and will have no influence toward introducing or eliminating a unidirectional component in those conductors, or in the galvanometer 23, such changes will have no effect upon the measurement of the variable resistance, and will introduce no error. Actual tests have shown that the resistance of the interconnecting lines 20 and 22 may be varied through a resistance range corresponding to many times the nominal resistance of the variable resistance 10 without introducing an error in its measurement, or having any effect beyond a slight variation in the sensitivity of measurement. For similar reasons, neither variation in the supply voltage at the transformer 19, nor alternating voltages introduced at any point in the conductors 20, 21 and 22 will have any effect on the accuracy of the system. The fact that the accuracy of measurement is unaffected by changes in the resistance of the interconnecting line renders the system particularly advantageous in its application to multiple-point measurement or where it is desired to determine interchangeably the resistance of a plurality of sensitive elements. The network as described therefore removes the usual objections to the otherwise necessary precautions in maintaining the contact resistance of the transfer switch at a low value, and makes it unnecessary to compensate for different resistance values of different connecting lines, or for variations in such values due to changes in ambient temperature, etc.

The characteristics of insensitivity to changes in lead resistance and to alternating voltage introduced into the leads by induction or conduction, renders the system particularly well suited to determination of temperatures by a multiple-point installation of the type having a common ground return, and requiring only a single conductor to each of the temperature-sensitive resistance bulbs employed. Such an installation is shown in Figure 3, wherein, by means of a dial-switch 30, connection of the measuring circuit may be made at will to any one of the plurality of temperature sensitive resistance elements 110, 210, 310, etc. Connection of the resistor 110 into a loop with rectifiers 111 and 112, is made in the same manner as that of the resistance element 10 with rectifiers 11 and 12 in Figure 1. A conductor 120 is connected from the point between the rectifiers 111 and 112 to one contact point of the dial-switch 30, the common contact of said switch being connected to the conductor 20 corresponding exactly with the similarly designated conductor in Figure 1. The point between the resistance element 110 and the rectifier 112 is connected to ground, and the conductor 22 of the measuring circuit is also grounded. In a similar manner the temperature sensitive resistor 210 is included in a loop with rectifiers 211 and 212, the point between said rectifiers being connected by a conductor 220 to a further point of the switch 30, and the point between the resistance element 210 and the rectifier 212 being grounded. Likewise, the element 310 is interconnected with rectifiers 311 and 312, in a loop connected to ground, and by a conductor 320 to a further point in the dial-switch 30. The fixed resistor 13, the adjustable resistor 14, the rectifiers 15 and 16 and the movable contact 17 are interconnected in a manner identical to that shown in Figure 1, and, with the graduated scale 18 and the dial-switch 30, are incorporated in an instrument 31. The instrument 31 includes also the galvanometer 23 and its associated filter circuit, thus providing an integral unit whereon may be measured the value of whichever of the variable resistors 110, 210, 310 etc. may be connected into the measuring circuit by the dial-switch 30.

I claim:

1. Apparatus for measuring the resistance of an electric circuit element in relation to a circuit element of known resistance, comprising a divided circuit having one of said elements in each of its branches, rectifying means in each of said branches whereby to permit the flow of alternating current half-waves of one polarity through one of said branches and alternating current half-waves of the opposite polarity through the other branch, means for effecting adjustment of the relative amplitudes of the rectified currents in said branches, a circuit including in series said divided circuit, a source of alternating current in said circuit, means for detecting a unidirectional component in the circuit and means for determining the extent of said adjustment to reduce the unidirectional component to zero.

2. In an electric system for measuring the departure of a variable resistance from a nominal value, a fixed resistance of value corresponding to said nominal value, a voltage dividing resistance of value corresponding to said departure, a two-conductor circuit extending from the location of said variable resistance to that of said dividing resistance, said circuit including at said first location a devided section of which one branch contains said variable resistance and a rectifier in series and the other branch contains a rectifier, said rectifiers being so disposed that alternating half-waves of one polarity will traverse said variable resistor and half-waves of the opposite polarity will by-pass the same, and said circuit including at said second location a further divided section of which one branch contains said fixed resistance, a portion of said voltage dividing resistance, and a rectifier, and the other branch contains a further rectifier and the remainder of said voltage dividing resistance, said rectifiers being disposed similarly to those in said first-named divided section, a source of alternating current for energizing the circuit, means for detecting a unidirectional current in the circuit, resulting from variations in the value of the variable resistance, and means for measurably proportioning the voltage dividing resistance to reduce the unidirectional current to zero.

3. In an electric network for measuring the departure of a variable resistance element from a nominal value, a loop containing said resistance element in series with a pair of rectifiers of similar polarity about the loop and having a tap therebetween, a second loop comprising in series a fixed resistor of value equal to the nominal value of said variable resistance element, a resistor having a total value corresponding to the departure to be measured and provided with a movable contact adjustable therealong through the range of said value with means to determine the magnitude of said adjustment, and a second pair of rectifiers of similar polarity about said second loop, and having a tap therebetween, a source of alternating current for energizing the network and connected between said tap of the first loop and the tap of the second loop, a detector of unidirectional current connected between the two loops from a point between the variable resistance and one of the rectifiers of the first loop to the adjustable contact of the second loop, and filtering means for by-passing alternating current around the detector.

4. In combination, a variable resistance, a first loop including the same and a pair of rectifying elements of similar polarity about the loop, a fixed resistance, a voltage dividing resistance having an adjustable contact, a second loop including in series said fixed and voltage dividing resistances and a second pair of rectifying elements of similar polarity about the second loop, a source of alternating current connected from a point between the two rectifiers of the first loop to a point between the two rectifiers of the second loop, an electric connection from the adjustable contact of the voltage dividing resistance to a point between the variable resistance and one of the rectifiers of the first loop, with means in said connection for detecting unidirectional components of the current flowing therein.

5. In a resistance thermometer, a temperature-sensitive resistance element, a closed loop including said element in series with a pair of rectifying elements of similar polarity about the loop, a second closed loop comprising a fixed resistance element of value corresponding to the value of said sensitive element at a predetermined temperature, a voltage dividing resistance element of value corresponding to the deviation of said sensitive element within its working range, a second pair of rectifying elements of similar polarity about said second loop, a contact slidably mounted on the voltage dividing resistance, an electrical connection from the slidably mounted contact to a point between the temperature sensitive resistance element and one of the rectifying elements of the first loop, means in said connection for detecting unidirectional current flowing therein, a source of alternating current connected from a point between the two rectifying elements of the first loop to a point between the two rectifying elements of the second loop, and measurable means for changing the position of the contact along the length of the voltage dividing resistance to eliminate any unidirectional current created by changes in the temperature sensitive resistance and visualized by the detecting means.

6. In a device of the class described, the combination with a circuit which includes two branches one of which contains a variable resistance and a rectifier in series therewith for passing current in one direction and the other of which contains a rectifier for passing current in the opposite direction, of a third and a fourth branch, one of which contains a rectifier for passing current in said one direction and the other of which contains a fixed resistance and a rectifier in series therewith for passing current in said opposite direction, a source of alternating current for energizing the circuit, means for detecting any direct current component in the circuit as caused by changes in the variable resistance, and independent means for measurably changing the relative resistance of the third and fourth branches to eliminate said component.

7. In a device of the class described, the combination with a loop consisting of a variable resistance and two rectifiers of the same polarity in series, of a second loop consisting of a second variable resistance, a third rectifier and a fourth rectifier of the same polarity in series, a third loop consisting of a third variable resistance, a fifth rectifier and a sixth rectifier of the same polarity in series, a fourth loop consisting of a fixed resistance, a seventh rectifier and an eighth rectifier in series, a common connection for a point between the variable resistance and one of the rectifiers of the first loop, a point between the variable resistance and one of the rectifiers of the second loop, and a point between the variable resistance and one of the rectifiers of the third loop, a multiple connecting means for connecting a point between the two rectifiers of the fourth loop with any one of the points between the rectifiers of the first, second, or third loops, a source of alternating current in series with the point between the two rectifiers of the fourth loop and the multiple connecting means, a second resistance in the fourth loop located between the fixed resistance and one of the rectifiers, a contact slidably mounted thereon, connecting means between said common connection and the sliding contact, said connecting means including means for detecting a unidirectional component caused by a difference in the average values of the current components of opposite polarity flowing in said connecting means, means for reducing said difference to zero, said reducing means consisting of means for measurably moving the slidable contact along the second resistance to change the relative resistance of that part of the fourth loop which includes the fixed resistance and one of the rectifiers of said loop with respect to the resistance of that part of said loop which includes the other rectifier.

8. The combination with a circuit which includes a temperature responsive resistance and rectifying means for passing current in one direction only, of a second circuit which includes a fixed resistance and rectifying means for passing current in the opposite direction only, a common source of alternating current for energizing both of said circuits, means in series with the source for detecting a direct current component resulting from changes in the relative value of the temperature-responsive resistance with respect to the fixed resistance, and means for measurably changing the relative resistance of the two circuits to eliminate any direct current component.

9. The method of measuring the resistance of an electric circuit element in relation to a circuit element of known resistance, which comprises dividing an alternating current into two pulsating components of opposite polarities, passing one of said components through each of said circuit elements, combining said components to produce an alternating current containing a unidirectional component caused by a difference in the resistance of the circuit elements, effecting adjustment of the relative amplitudes of said pulsating components to reduce to zero any unidirectional component of said alternating current and determining the extent of said adjustment.

10. In a device of the class described, the combination with a plurality of closed loops each comprising a variable resistance and a pair of rectifiers of the same polarity in series, and each of said loops having a first tap between the variable resistance and one rectifier and a second tap between the two rectifiers of each pair, of a further loop comprising in series a fixed resistance, a voltage dividing resistance having a contact slidably engaging same, two rectifiers of similar polarity included in series about said last-named loop, a third tap between the two rectifiers, a source of alternating current having two terminals one of which is connected to said third tap and the other to the common terminal of a selective switch whereby said third tap may be connected with any one of the second taps of said plurality of loops, interconnecting means between all the first taps of said plurality of closed loops, a connection between said interconnecting means and the slidable contact, said connection including detecting means responsive to a unidirectional component of the current flowing therein, and means for measurably moving the slidable contact along said voltage dividing resistance to eliminate any unidirectional current as caused by changes in the variable resistance of whichever of the plurality of loops is connected by means of said selective switch.

FRITZ FREDERICK UEHLING.

REFERENCES CITED

The following references are of record in the file of this patent:

UNITED STATES PATENTS

| Number | Name | Date |
| --- | --- | --- |
| 1,404,311 | O'Neill | Jan. 24, 1922 |
| 2,200,863 | Schuck | May 14, 1940 |
| 2,459,849 | Stateman | Jan. 25, 1949 |

FOREIGN PATENTS

| Number | Country | Date |
| --- | --- | --- |
| 754,338 | France | Nov. 6, 1933 |